July 14, 1959
G. L. CUNNINGHAM ET AL
2,894,975
METHOD FOR RECOVERY OF TRIALKYL BORATES
FROM METAL TETRAALKOXYBORATES
Filed Dec. 21, 1955
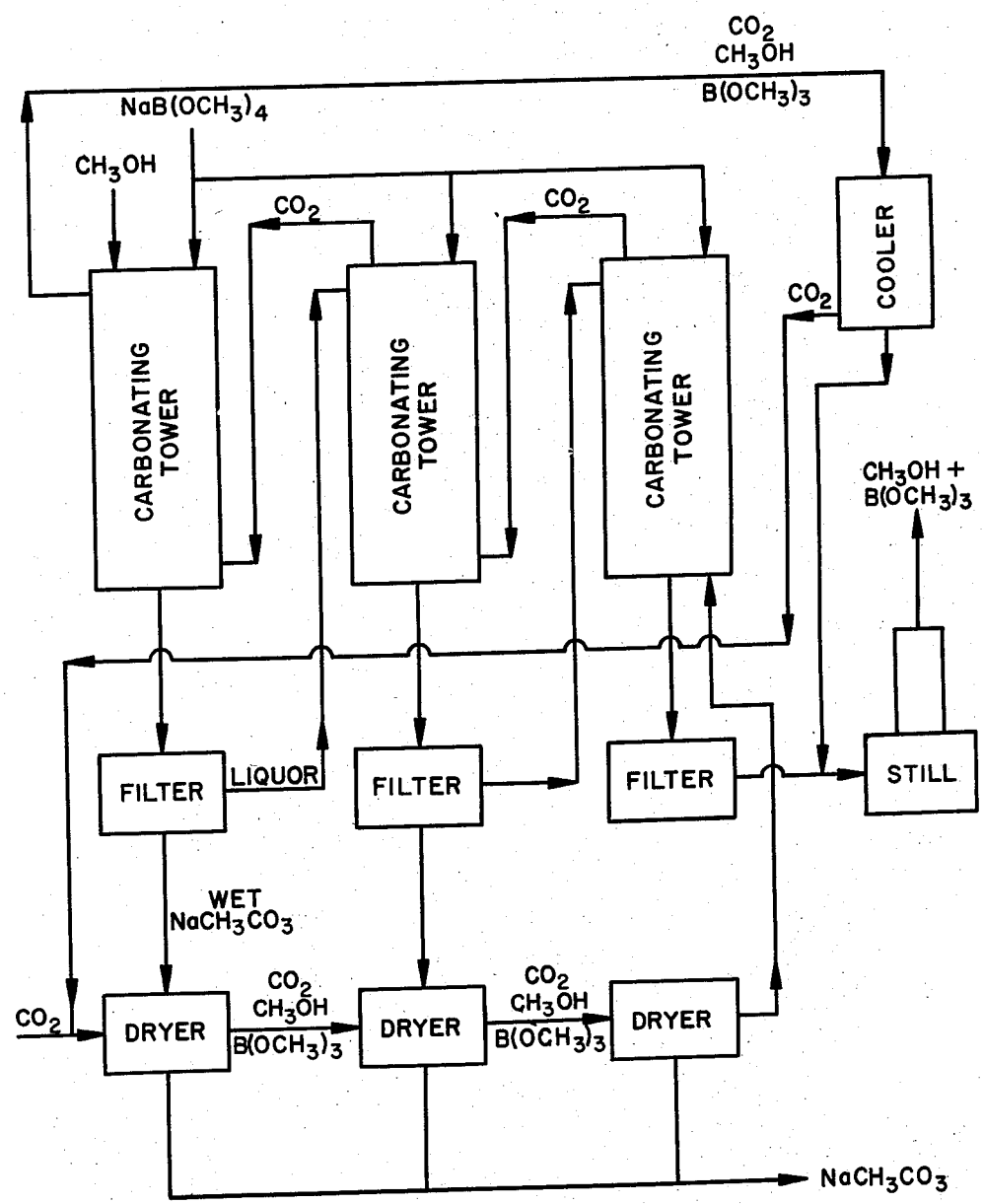
RECOVERY OF $B(OCH_3)_3$ FROM $NaB(OCH_3)_4$
INVENTORS
George L. Cunningham
BY Frank Pretka
Neal J. Mosely
their Attorney : 2,894,975
Patented July 14, 1959

2,894,975

METHOD FOR RECOVERY OF TRIALKYL BORATES FROM METAL TETRAALKOXYBORATES

George L. Cunningham and Frank Pretka, Cleveland, Ohio, assignors to Callery Chemical Company, Pittsburgh, Pa., a corporation of Pennsylvania Application December 21, 1955, Serial No. 554,506

3 Claims. (Cl. 260—462)

This invention relates to a new and improved method for the recovery of trialkyl borates from metal tetraalkoxyborates. More particularly, it relates to a simple and economical method of preparing trialkyl borates such as trimethyl borate, $B(OCH_3)_3$, by the carbonation of an alcoholic solution of an alkali metal or alkaline earth metal tetraalkoxyborate such as sodium tetramethoxyborate, $NaB(OCH_3)_4$, in such a manner as to build up the concentration of the trialkyl borate in the liquid phase.

The trialkyl borates in general and trimethyl borate in particular are important intermediates in the preparation of high energy fuels. The best known methods for preparing trialkyl borates are the reaction of boric acid with an alcohol or the reaction of borax with an alcohol in the presence of an inorganic acid such as hydrochloric acid. The preparation of trimethyl borate has been extensively investigated. This compound can be readily obtained by the pyrolytic decomposition of sodium tetramethoxyborate, $NaB(OCH_3)_4$, or sodium trimethoxyborohyride, $NaBH(OCH_3)_3$. In one method for the preparation of sodium borohydride, $NaBH_4$, a large amount of sodium tetramethoxyborate is obtained as a by-product. In order to make this and similar reactions workable on a large scale, it has become necessary to develop a method for converting alkali metal and alkaline earth metal tetraalkoxyborates into the corresponding trialkyl borates.

One object of this invention is to provide a new and improved method for the recovery of trialkyl borates from metal tetraalkoxyborates.

Another object is to provide a simple and efficient method for converting alkali and alkaline earth tetralkoxyborates into the corresponding trialkyl borates.

A further object is to provide an economical method for recovering trimethyl borate by the carbonation of an alcoholic solution of sodium tetramethoxyborate in such a manner as to concentrate the trimethyl borate in the liquid phase.

Other objects will appear throughout the following specification and appended claims.

This new and improved method for converting alkali and alkaline earth tetraalkoxyborates into trialkyl borates will be completely described hereinafter and the novelty thereof will be particularly pointed out and distinctly claimed.

In the accompanying drawing there is shown a flow diagram illustrating this process for recovering $B(OCH_3)_3$ from $NaB(OCH_3)_4$.

When an alcoholic solution of a metal tetraalkoxyborate is reacted with dry carbon dioxide, a trialkyl borate and a metal alkyl carbonate are produced as follows:

$$2MB(OR)_4 + 2CO_2 \rightarrow 2MRCO_3 + 2B(OR)_3$$

In this reaction, M may be a metal such as sodium, potassium or calicum and R may be a lower alkyl radical such as methyl, ethyl, propyl or butyl.

This reaction is particularly effective in recovering trimethyl borate by the carbonation of a methyl alcohol solution of sodium tetramethoxyborate. We have found that in order to build up the concentration of trimethyl borate in the methyl alcohol solution, it is necessary to use relatively large amounts of sodium tetramethoxyborate. However, it is not possible to carbonate such large amounts of $NaB(OCH_3)_4$ in one step because the slurry becomes too thick. Hence, it is necessary to carbonate in steps. The removal of sodium methyl carbonate from such slurries removes relatively large amounts of trimethyl borate from the solution. This removal becomes appreciable as the concentration of trimethyl borate increases in the liquid layer. This invention is based upon the discovery that by carbonating in steps the sodium methyl carbonate can be removed from these slurries without undue loss of trimethyl borate.

As an example of how the process of the present invention operates, trimethyl borate was prepared as follows: a methyl alcohol solution of $NaB(OCH_3)_4$ was introduced into the top of each of a series of carbonating towers and reacted with $CO_2$ gas. The slurry formed in each tower was filtered. Dry carbon dioxide was passed over the wet filter cakes in a counter-current fashion. In this manner, fresh carbon dioxide was passed over the wet crystals of $NaCH_3CO_3$ containing the least trimethyl borate and then over the wet crystals containing the most trimethyl borate. Thus, the $CO_2$ leaving this stripping operation contained considerable amounts of trimethyl borate and methyl alcohol. The $CO_2$ was passed over the wet crystals at room temperature but it can be done at any temperature below the decomposition temperature of sodium methyl carbonate. The $CO_2$ gas containing trimethyl borate and methyl alcohol was passed through the carbonating tower containing the slurry with the highest concentration of trimethyl borate. The filtrate from each filtration was passed countercurrent through the entire series of carbonating towers. Thus, the filtrate from the slurry in the first tower was passed through the second tower and so on for all the towers. The filtrate from the last slurry was concentrated with trimethyl borate and was distilled to recover the azeotrope of trimethyl borate and methyl alcohol. The dry sodium methyl carbonate obtained as a by-product may be converted to sodium carbonate and methyl alcohol if desired.

Similarly, other metal tetraalkoxyborates such as potassium tetraethoxyborate, calcium tetrapropoxyborate and sodium tetrabutoxyborate when carbonated in ethanol, propanol or butanol solutions respectively and treated in the manner described will produce substantial yields of triethyl, tripropyl and tributyl borate.

In accordance with the patent statutes, we have described this invention fully and completely and set forth what is now considered to be the best mode of operating the same. It should be understood, however, that other variations are possible and that within the scope of the appended claims this invention may be practiced otherwise than as specifically described.

What is desired to be claimed and secured by United States patent is:

1. A method of recovering tri-lower alkyl borates from metal tetra-lower alkoxyborates which comprises passing an alcoholic solution of a compound selected from the group consisting of alkali and alkaline earth metal tetra-lower alkoxyborates into a first reaction zone, treating said alcoholic solution with dry carbon dioxide whereby tri-lower alkylborate and a solid lower alkyl carbonate are produced, filtering the resulting reaction mixture to obtain a filtrate and then passing said filtrate to a reaction zone, adding more of said tetra-lower alkoxyborate to said filtrate, then treating the resulting mixture with dry carbon dioxide to further enrich the liquid mixture in tri-lower alkylborate, filtering the resulting enriched liquid mixture and recovering tri-lower alkylborate from the then resulting filtrate by distillation.

2. A method according to claim 1 in which said tetra-lower alkoxyborate is sodium tetramethoxyborate the tri-lower alkylborate recovered is trimethyl borate and the alcohol used is methyl alcohol.

3. A method according to claim 2 in which said dry carbon dioxide is continuously passed through said reaction zones countercurrent to the direction of said methyl alcohol solution.

References Cited in the file of this patent

Schlesinger et al.: Journal Amer. Chem. Soc., 75, pp. 186–190 (1953).

Brown et al.: Journal Amer. Chem. Soc., 75, pp. 192–195 (1953).